(12) United States Patent
Gonzalez

(10) Patent No.: US 7,315,986 B2
(45) Date of Patent: Jan. 1, 2008

(54) ELECTRONIC DOCUMENT HANDLING SYSTEM AND METHOD

(75) Inventor: Manuel Gonzalez, Barcelona (ES)

(73) Assignee: Hewlett-Packard Development Company L.P., Houston, TX (US)

( * ) Notice: Subject to any disclaimer, the term of this patent is extended or adjusted under 35 U.S.C. 154(b) by 840 days.

(21) Appl. No.: 09/984,929

(22) Filed: Oct. 31, 2001

(65) Prior Publication Data
US 2003/0080998 A1   May 1, 2003

(51) Int. Cl.
*G06F 3/00* (2006.01)
(52) U.S. Cl. .................. 715/752; 715/753; 715/758
(58) Field of Classification Search ............. 345/751, 345/752, 753; 715/751–759; 709/204–207
See application file for complete search history.

(56) References Cited

U.S. PATENT DOCUMENTS

| | | | |
|---|---|---|---|
| 6,636,240 B1* | 10/2003 | Centerwall et al. | 345/752 |
| 2001/0002469 A1* | 5/2001 | Bates et al. | 707/1 |
| 2002/0026480 A1* | 2/2002 | Terada | 709/206 |

OTHER PUBLICATIONS

IBM Technical Buletin Disclosure, Mar. 1994, vol. 37, issue 3, pp. 613-614.*

* cited by examiner

*Primary Examiner*—Ba Huynh

(57) ABSTRACT

A method of operating an electronic document distribution system arranged to distribute documents over a network including the steps of: composing an electronic document; addressing said document with a plurality of recipient addresses; in response to a user input creating a distribution list corresponding to said plurality of recipient addresses; and, distributing said electronic document.

1 Claim, 1 Drawing Sheet

ELECTRONIC DOCUMENT HANDLING SYSTEM AND METHOD

TECHNICAL FIELD OF THE INVENTION

The present invention relates to an improved method and system for handling the distribution of electronic documents, particularly but not exclusively, electronic mail (e-mail).

BACKGROUND OF THE INVENTION

The electronic distribution of documents, such as by e-mail, provides substantial advantages over conventional distribution methods. One of the most important of these advantages is the ability to allow a user to distribute a given message or document to a number of recipients, substantially instantaneously.

Distribution list functions in commercially available e-mail software, such as Microsoft™ Outlook™, have been designed to help with this issue.

Distribution lists allow a group of selected recipients to be identified. By addressing a message to such a group, a message maybe delivered to each of the members of group, without the sender of the message having to address the message to each of those members individually. The distribution list may be subsequently reused for addressing further messages. Clearly this approach may save a significant amount of time when distributing electronic documents, especially in cases where the number of recipients is large.

Distribution lists may be generated and stored in a mail server of an e-mail system for example, in which case, the distribution lists may be made available to a large number, or possibly all of the users of the e-mail system. Alternatively, distribution lists may be generated and stored on the e-mail client. That is to say locally, on the computer of the individual e-mail user.

Generally, if the distribution lists are held on a mail server, they are controlled by a system administrator. Thus, if a distribution list required by a user does not already exist, then the user must contact the system administrator requesting that the distribution list in question should be created. However, distribution lists generated by system administrators are often subject to certain restrictions. For example, they are usually restricted to users in the same intranet, or domain due to internal policies. Amendments to such distribution lists are usually subject to the agreement of various individuals since the lists are shared. This means that adding or removing a recipient to or from an existing distribution list is often a difficult and slow process. Additionally, there is generally a delay associated with the process of requesting a system administrator to generate a new distribution list and make it available on a mail server.

Therefore, for many situations, distribution lists held on mail servers are perceived to be inflexible and difficult to use by many users, who instead prefer to generate and store their own distribution lists locally.

However, the process of generating distribution lists locally also suffers from certain drawbacks. As any regular user of commercially available e-mail applications knows, the use of distribution lists requires a significant amount of administration both in creating new distribution lists and in amending stored distribution lists. This administrative effort is secondary relative to the primary purpose of e-mail systems; namely, writing and sending e-mails. Thus, for many users, the use of distribution lists represents an irritation that for many situations outweighs the benefits that they provide.

It would therefore be desirable to provide an improved method and system for handling the distribution of electronic documents, which addresses the problems of the prior art.

SUMMARY OF THE INVENTION

According to one aspect of the present invention there is provided a method of operating an electronic document distribution system arranged to distribute documents over a network including the steps of: composing an electronic document; addressing said document with a plurality of recipient addresses; in response to a user input creating a distribution list corresponding to said plurality of recipient addresses; and, distributing said electronic document.

The present invention makes it possible for a user to generate a distribution list on the fly, or in real time. That is to say that he or she may create the distribution list at substantially the same time as creating or sending the electronic document or message. Thus, in the present invention, the user need not create a distribution list before the document is composed or before sending the document, yet, the user may nevertheless save the group of recipients to which the document was addressed as a distribution list for future use at the time of sending the document.

By automatically giving the user the possibility of saving the group of addresses used as a distribution list, when sending the document, several advantages are realised. Firstly, it does not require any prior organisational or administrative effort on the part of the user. Secondly, it does not require the user to navigate through the often complex functions of the software application to create a distribution list. Thirdly, the method by which the distribution list may be created may be very intuitive and the speed with which the process may be carried out by the user may be dramatically increased. As a consequence, the user may be able to take better advantage of using distribution lists on a day to day basis.

Preferably, the method is applied to the field of e-mail distribution, remote proofing or instant messaging.

According to a further aspect of the present invention there is provided in a system adapted to communicate electronic documents to a plurality of receiving apparatus via a communication network, a method of generating a distribution list including the steps of: generating an electronic document; addressing said document with a plurality of recipient addresses; saving said plurality of recipient addresses as a distribution list in response to a trigger event; and, distributing said electronic document.

According to a further aspect of the present invention there is provided in a computer apparatus associated with a communication network and adapted to receive electronic documents from one or more network addresses of said network, a method of generating a distribution list including the steps of: receiving an electronic document communicated to a plurality of network addresses; identifying from said electronic document address data identifying the network addresses of a plurality of recipients of said document; and, saving said identified address data as a distribution list.

According to a further aspect of the present invention there is provided a computer apparatus adapted to transmit an electronic document via a communication network to a plurality of network addresses of said network and further adapted to carry out steps of: in response to information input by a user generating an electronic document; in response to addressing information input by said user, determining a plurality of network addresses to which said document is to be transmitted; in response to a user input creating a distribution list corresponding to said determined network addresses; and, transmitting said electronic document to said determined network addresses.

The present invention also extends a computer program arranged to implement the method of the invention and to a storage medium or data carrier carrying a computer program arranged to implement the method of the invention.

For a better understanding of the invention and to show how the same may be carried into effect, there will now be described by way of example only, specific embodiments, methods and processes according to the present invention with reference to the accompanying drawings in which:

DETAILED DESCRIPTION OF THE PREFERRED EMBODIMENTS

There will now be described by way of example only the best mode contemplated by the inventors for carrying out the invention.

The following description will be given in the context of an e-mail application running on a stand-alone computer connected to the Internet via an e-mail server computer. However, this is not to be construed as a limiting application. It will be clear to the skilled reader that with suitable modification the present invention is equally applicable to a wide range of architectures where electronic documents may be sent to a number of recipients. These may include: local area networks (LANs); wide area networks (WANs); or, wireless connections and the like.

First Embodiment

Figure 1:
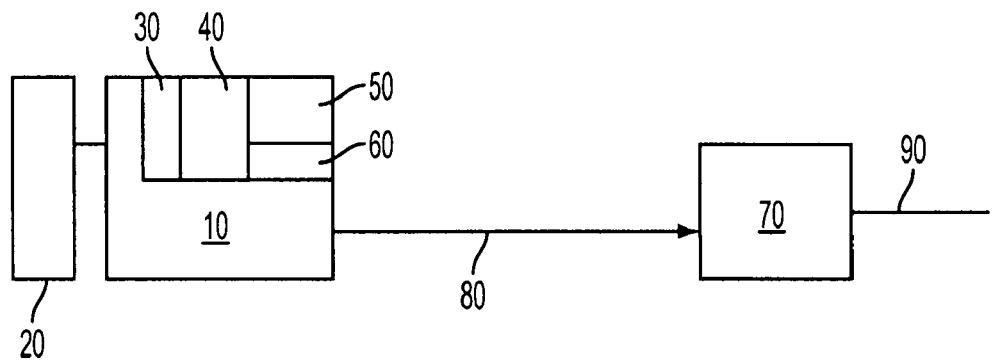
FIG. 1 illustrates a highly simplified schematic representation of the hardware architecture of an embodiment of the present invention.

FIG. 1 illustrates a highly simplified schematic representation of the architecture of the present embodiment of the invention. The figure shows a stand-alone personal computer (PC) 10. The PC includes an interface 20 such as keyboard, through which a user may input data and user commands, and a monitor, on which a Graphical User Interface (GUI) of a software application may be displayed. The PC also includes at least one microprocessor 30 and memory 40, such as RAM.

The program code of an e-mail application 50 is stored in the memory of the PC. The code of the e-mail application is arranged to be run by the microprocessor of the PC. Thus, in the present embodiment, the e-mail application operates locally. Furthermore, the data corresponding to an e-mail generated by the user, referenced 60 in the figure, is also stored locally in the memory of the PC.

The PC is connected to an e-mail server 70, by a conventional connection. For the sake of simplicity, this is illustrated in the figure as a direct connection. However, in practice, the connection will generally be routed via one or more further computing devices. In the present embodiment, the connection between the PC and the e-mail server is illustrated by a conventional dial-up connection 80. However, any other suitable connection may instead be used. The PC is in turn connected to the Internet, also by a conventional connection 90.

Figure 2:
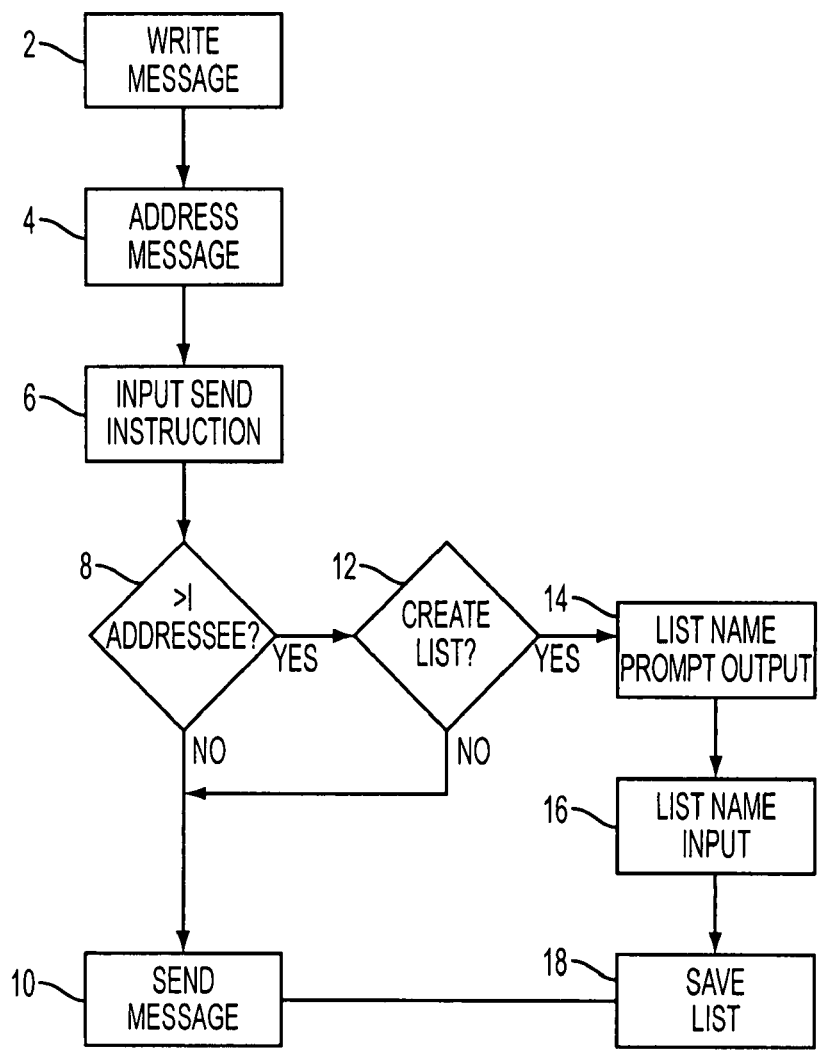
FIG. 2 is a flow diagram illustrating the method of an embodiment of the present invention.

Referring to FIG. 2, the method of the present embodiment will be described.

At step 2, of the method of the present embodiment, the user composes an e-mail message in a conventional manner. Thus, the e-mail may contain text, graphics, attached files or any other form of electronic communication. A number of suitable commercially available e-mail applications, together with suitable mail interfaces and file formats are well known in the art so the background of e-mail applications will not be discussed further in detail.

The user then specifies the recipient or recipients to whom the message is to be sent, at step 4. Again this may be carried out in a conventional manner. Therefore, the user may type in the e-mail address of each intended recipient in the relevant address fields; "to:", "cc:" and "bcc:" fields, for example. Alternatively, the user may select the names, or other identifiers of the intended recipient(s) from a conventional electronic address book. The skilled reader will appreciate that the user may instead or as well as addressing the message to individual addresses, address it to one or more groups of recipients, defined by distribution lists stored in the memory of the PC, associated with the application software.

The step of addressing the message may in practice be carried out before, during or after the step of composing the message. However, for the sake of convenience, it is illustrated in FIG. 2 as being carried out after composing the message.

When the e-mail message is competed and correctly addressed, the user inputs the instruction to send the message, at step 6. As is conventional, this is carried out by "clicking" on the "send" icon of the GUI using a mouse, however, any other suitable method of doing so may instead be used.

At step 8, the application determines whether the message is to be sent to two or more individual recipients, or to two or more groups, or to at least one individual recipient and at least one group. In the event that it is determined that the message is addressed to only one recipient or one group, the message is sent to the named recipient or group at step 10. This is carried out in a conventional manner and thus the e-mail message is sent to the e-mail server for spooling and forwarding according to known e-mail handling techniques.

If, on the other hand, it is determined at step 8 that the message is addressed to more than one recipient, group or combination of the two, the method proceeds to step 12. At step 12, the PC outputs a prompt to the user proposing to create a distribution list containing each of the e-mail addresses specified by the user at step 2. In the event that one or more groups are included among the e-mail addresses specified by the user at step 2, it will be understood that in the present embodiment the proposed distribution list includes each of the individual e-mail addresses contained in the one or more groups in addition to any individually specified e-mail addresses.

In this embodiment, the prompt is output using a text message displayed in a "window" in the GUI of the e-mail application software in a conventional manner. Additionally, in the present embodiment, "yes" and "no" option buttons are also contained in the same "window". The user may input an instruction to create the distribution list by "clicking" on the "yes" option button using a mouse, for example. Alternatively, if the user does not wish to create the distribution list, this instruction may be inputted by "clicking" on the "no" option button in a similar manner.

Although it is now conventional to use Windows™ based e-mail applications, the skilled reader will appreciate that the present embodiment may be implemented using non-Windows™ based e-mail applications. In this case, alternative methods for inputting and outputting data, as are well understood in the art, may instead be used.

If the user selects not to create the distribution list, the message is sent, at step 10, to each of the recipients specified at step 4, again in a conventional manner.

If, however, the user selects to create the distribution list, the application outputs a further dialogue box prompting the user for a name, or other identifier, for identifying the distribution list that is to be generated, at step 14. The user may then input a name for the distribution list in a conventional manner, at step 16. This may be done, for example, by typing the name for the new distribution list and then hitting the "return" or "enter" key of the keyboard of the PC. When the user enters the data corresponding to the distribution list's name, the application saves the newly created distribution list to memory in a conventional manner at step 18. This may either be to the user's "address book" or any other suitable location.

The application then sends the message to each of the recipients named at step 10, again in a conventional manner.

The skilled reader will appreciate that this embodiment of the present invention provides a method and system for handling the distribution of electronic documents which is highly intuitive with enhanced usability relative to known electronic documents distribution methods and system. As a result, it may be used to great advantage in the distribution of electronic documents, such as e-mails.

It will be understood by the skilled reader that a user may operate a PC programmed with a document distribution application according to the present invention in a very intuitive manner, since the creation of a distribution list is coupled to the act of sending a document. This is in sharp contrast to prior art methods in which the creation of a distribution list is decoupled from the act of sending a message. That is to say that in prior art methods, the functions associated with the creation of a distribution list are separate, both in terms of function and location in the software, from the functions of generating and sending documents. Moreover, in prior art methods, the act of generating a distribution list is further decoupled from the act of sending an e-mail, since it must be carried out in a separate process, prior to sending an e-mail.

Further Embodiments

In the embodiment described above, numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

For example, the skilled reader will appreciate that although the present embodiment was described with respect to e-mail distribution, it is not limited to such applications. For example, the present invention may equally be applied to instant "messaging services", such as Microsoft™ Messenger™. Additionally, the present invention may be applied to remote proofing software for use in the printing industries, where image documents are transmitted electronically between different individuals and/or entities. One example of such software is "RenderView™", developed jointly by Scitex™ and Rtimage™, available from Scitex America Corp.™, 8 Oak Park Dr., Bedford, Mass. 01730, 781-275-5150, fax: 781-275-3430, Web: www.scitex.com.

In fact, the skilled reader will appreciate that the present invention may be used in a wide range of applications where electronic documents are sent by entities having sending roles to a number of entities having receiving roles.

Furthermore, various modifications may be made to the exact manner in which the method of the invention is implemented, particularly with regard to the user interface and the order in which the processes of the invention are carried out.

For example, although in the above-described embodiment the prompt from the application for the user to select whether or not to generate a distribution list occurs automatically, this need not necessarily be the case. For example, the user may instead initiate the generation a distribution list by "clicking" on an icon of a graphical user interface with a mouse, or by using a keyboard input. The user may do so at any convenient time once the recipients have been correctly indicated in the address fields of the e-mail, prior to sending the e-mail.

Furthermore, an existing distribution list associated with the software of the e-mail application, stored in the memory of the PC, may be amended by the inclusion of one or more recipients. For example, at step 4 of FIG. 2, a user may enter in the address fields of an e-mail the name of an existing distribution list, and in addition to this, the e-mail address of one or more further recipients. At step 12, the application outputs a prompt to the user proposing to create a distribution list containing all of the e-mail addresses specified by the user at step 2; i.e. each of the recipients defined by the existing distribution list as well as the one or more further recipients. If the user responds in the affirmative to the prompt proposing to create a distribution list, the application will prompt the user for a name for the new distribution list, as described above with respect to step 14 of FIG. 2. If the user then chooses to assign the same name (which may be the default name offered by the application) to the new distribution list as was used for the existing distribution list, the system will overwrite the existing distribution list with the new distribution list. Thus, in this manner, the user has effectively added a recipient to the existing distribution list.

Similarly, an existing distribution list may be amended by the deletion of one or more recipients. For example, at step 4 of FIG. 2, a user may enter in the address fields of an e-mail the name of an existing distribution list. Conventionally, the name of the group or distribution list is then displayed in the relevant address field of the message. However, in the present embodiment, by "clicking" with the mouse on the name of the group in the address field, the name of the group or distribution list may be replaced by the individual e-mail addresses of the individual recipients in the distribution list. The user may then select one or more of the individual recipients in the distribution list and delete them from the address field in a conventional manner. If the user subsequently chooses to create a distribution list at step 12 of FIG. 2 and the user then chooses to assign the same name to the new distribution list as was used for the existing distribution list, the system will overwrite the existing distribution list with the new distribution list. Thus, in this manner, the user has effectively removed the deleted individual e-mail addresses from the existing distribution list.

The skilled reader will also appreciate that the present invention may be implemented such that a distribution list may be generated from the address data contained in received e-mails, or other received electronic documents. Thus, for example, when a user of an e-mail system receives an e-mail that contains in its address fields the e-mail addresses of a number of recipients he may input a user command to identify and save the address data as a distribution list. This distribution list may then be used in a normal manner when subsequently sending e-mails, or other received electronic documents.

What is claimed is:

1. A method of operating an electronic document distribution system arranged to distribute documents over a network including the steps of:

composing an electronic document;

addressing said document with a plurality of recipient addresses by at least one of adding a recipient address or selecting a recipient identifier;

in response to a user input, automatically creating a distribution list corresponding to said plurality of recipient addresses;

distributing said electronic document;

saving said distribution list at the time of distributing said electronic document; and assigning a name or other identifier to said distribution list prior to said saving step, wherein said user inputs said name or other identifier in response to a prompt output by the system.

* * * * *